(12) United States Patent
Godicke et al.

(10) Patent No.: US 6,205,513 B1
(45) Date of Patent: Mar. 20, 2001

(54) SYSTEM AND PROCESS FOR LOAD AN OPERATING SYSTEM OF AN INFORMATION PROCESSING DEVICE

(75) Inventors: Thomas Godicke, Valbonne; Giovanni Ianni, Pegomas, both of (FR)

(73) Assignee: Schneider Automation, Valbonne (FR)

( * ) Notice: Subject to any disclaimer, the term of this patent is extended or adjusted under 35 U.S.C. 154(b) by 0 days.

(21) Appl. No.: 09/043,923

(22) PCT Filed: Aug. 8, 1997

(86) PCT No.: PCT/FR97/01473

§ 371 Date: Apr. 9, 1998

§ 102(e) Date: Apr. 9, 1998

(87) PCT Pub. No.: WO98/08161

PCT Pub. Date: Feb. 26, 1998

(30) Foreign Application Priority Data

Aug. 22, 1996 (FR) .................................................. 97 16424

(51) Int. Cl.[7] .................................................... G06F 12/00
(52) U.S. Cl. ................................ 711/103; 713/2; 713/100; 710/240
(58) Field of Search ........................... 711/103, 100; 395/712

(56) References Cited

U.S. PATENT DOCUMENTS

| | | |
|---|---|---|
| 5,432,927 * | 7/1995 | Grote et al. .............................. 713/2 |
| 5,467,286 | 11/1995 | Pyle et al. . |
| 5,603,086 * | 2/1997 | Cree et al. ............................ 455/520 |
| 5,701,492 * | 12/1997 | Wadsworth et al. .................. 395/712 |
| 5,794,054 * | 8/1998 | Le et al. ................................ 710/240 |
| 5,835,761 * | 11/1998 | Ishii et al. ............................. 713/100 |

FOREIGN PATENT DOCUMENTS 2 295 908   6/1996   (GB) .

* cited by examiner

*Primary Examiner*—Do Hyun Yoo
*Assistant Examiner*—Nasser Moazzami
(74) *Attorney, Agent, or Firm*—Oblon, Spivak, McClelland, Maier & Neustadt, P.C.

(57) ABSTRACT

A process and system for updating an operating system for an information processing device via a console link or mass memory. The information processing device including a power supply with an energy reserve, a microprocessor, an erasable flash EPROM type memory, a backed up RAM memory, and a device for detecting main power supply failures. When making an update, the existing operating system transfers a boot program into the backed up RAM, then executes this boot program stored in RAM, this boot program stored in RAM erasing the Flash EPROM memory and then loading the new operating system into the Flash EPROM from the console link or the mass memory.

4 Claims, 2 Drawing Sheets

SYSTEM AND PROCESS FOR LOAD AN OPERATING SYSTEM OF AN INFORMATION PROCESSING DEVICE

BACKGROUND OF THE INVENTION

1. Field of the Invention

This invention relates to a process for loading an operating system of an information processing device with a microprocessor such as a computer or programmable logic controller.

2. Discussion of Background

The operating system forms the basic software, in a computer in the same way as in a programmable logic controller. It provides an environment, in liaison with the computer or PLC components, in which the application software or programs (often called "applications") can operate.

There are information processing devices such as the PLC in FIG. 1 that are equipped with a backed up RAM memory and in which the operating system is fully or partly located in an erasable Flash EPROM memory.

The operating system is provided with a boot program for starting the device and for loading the Flash EPROM memory when the said system is updated.

This update starts by erasing the Flash EPROM, and it will be impossible to restart the device if there is a power failure before the boot program (FIG. 2) is completely loaded.

The blocking situation thus generated makes it necessary to return the device to the factory or to work on site to replace the Flash Eproms that have lost their operating system.

SUMMARY OF THE INVENTION

The purpose of this invention is to reduce the risk of losing the operating system if a mains power supply failure occurs before the boot program (by definition, the boot program is the smallest software capable of starting the equipment and loading a complete operating system) has finished loading.

The process for loading an operating system according to the invention is applicable to an information processing device comprising a power supply with an energy reserve, a microprocessor, an erasable Flash EPROM memory; a backed up RAM memory; a device for detecting mains power supply failures; a console link or mass memory for updating the operating system and it is characterized by the fact that when making an update, the operating system transfers the boot program into the backed up RAM, then executes this boot program stored in RAM, this boot program stored in RAM erasing the Flash EPROM memory and then loading the new operating system into the Flash EPROM from the console link or the mass memory.

According to one characteristic, when a mains power supply failure is detected, the reserve energy in the power supply is sufficient for the boot program to program the pointer to the entry point in backed up RAM into the Flash EPROM memory so that when mains power returns, the microprocessor starts the boot program stored in RAM at the Restart address.

We will now describe this invention referring to an embodiment given as an example and represented by the appended drawings in which:

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 1:
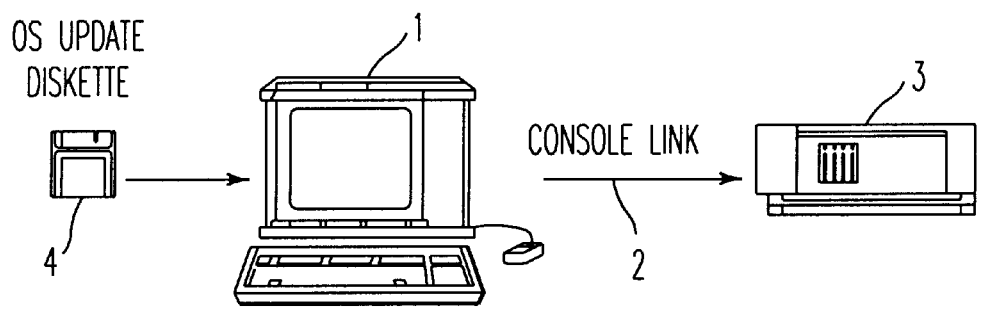
FIG. 1 represents the external view of the update to the operating system of a PLC.
Figure 2:
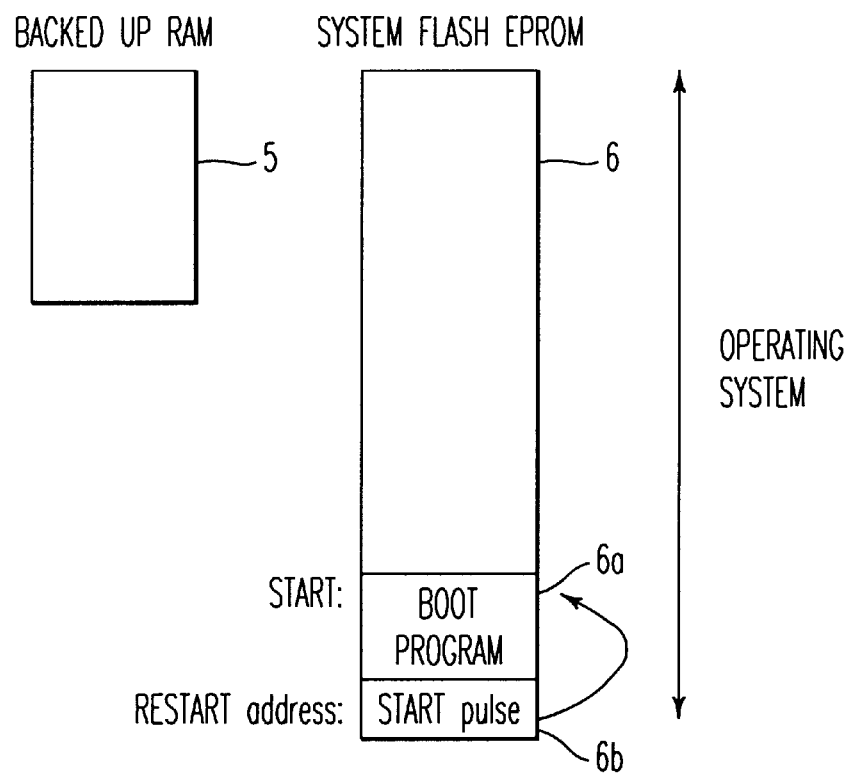
FIG. 2 illustrates the internal organization of the Flash EPROM and the backed up RAM in a loading process that does not use the invention.
Figure 3:
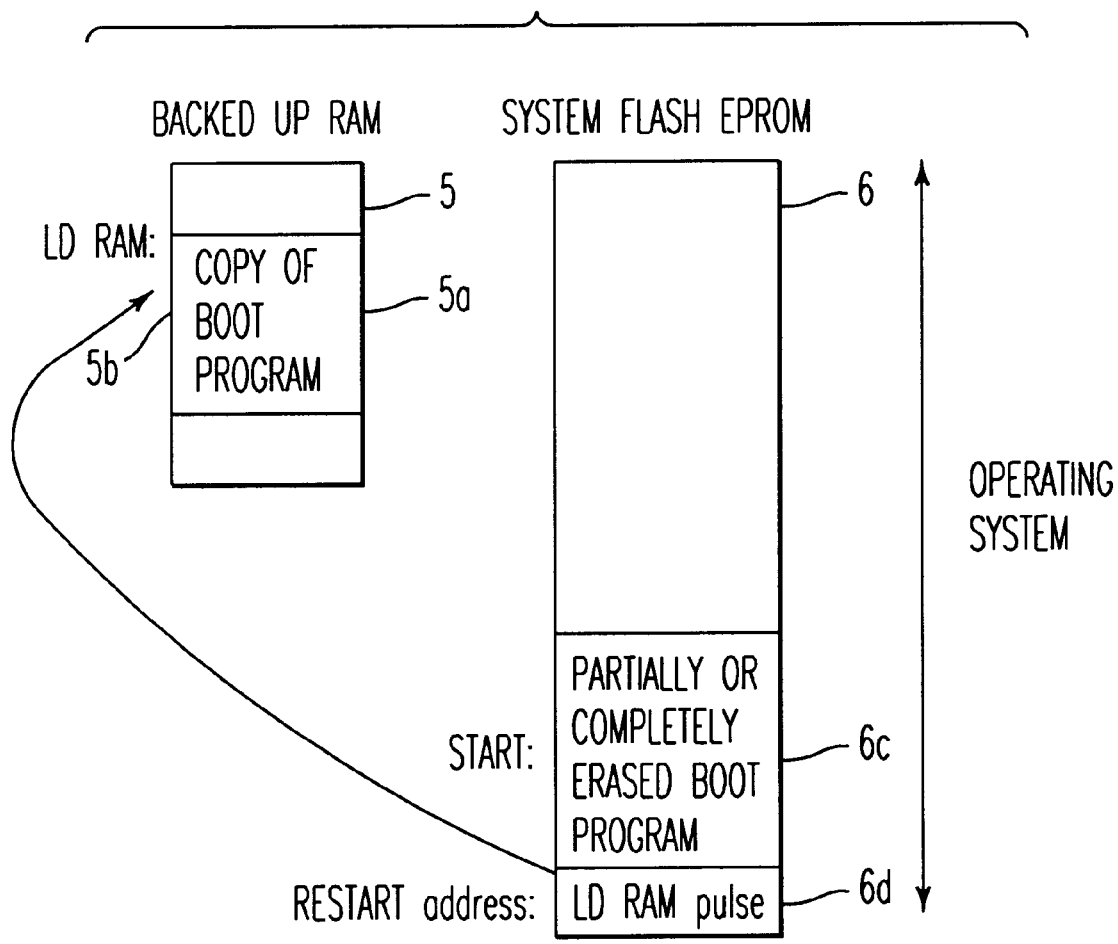
FIG. 3 illustrates the internal organization of the Flash EPROM and the backed up RAM for a loading process according to the invention.

Referring now to the drawings, wherein like reference numerals designate identical or corresponding parts throughout the several views, and more particularly to FIGS. 1–3 thereof, there is illustrated a hardware configuration according to the present invention.

The hardware configuration shown in FIGS. 1–3 consists of a programmable logic controller (PLC) 3 and a PC or terminal type programming console 1. The PLC 3 and its console 1 are connected by link 2 through which they can communicate. The PLC 3 has a power supply with an energy reserve (i.e., backup power function), a microprocessor(not shown), an erasable Flash EPROM type memory 6, a backed up RAM memory 5, a device for detecting main power supply failures (not shown), and a console link 2. The operating system is provided with a boot program 6a for starting the PLC 3 and loading the Flash EPROM memory 6. The operating system is updated using diskette 4.

As an alternative, the configuration shown in FIG. 1 may consist of a computer 1 alone, provided that it includes the above devices mentioned for the PLC 3. In this case, the purpose would be to update the operating system of the computer 1 itself.

When an update is made, the operating system will run the boot program 6a which starts by placing itself in portion 5a of the backed up RAM 5.

Since the copy of the boot program 5a is now in the RAM 5, it can then erase the portion 6c of the Flash EPROM 6 and load the new operating system contained on diskette 4 through the console link 2.

At the end of loading, the contents of diskette 4 will have been transferred to the Flash EPROM and the PLC 3 can restart on the new operating system.

When a main power failure is detected before loading is finished, the power supply energy reserve enables the boot program to mark the pointer to its own entry point (LD_RAM) 5b in backed up RAM 5, at the Restart address 6d of the microprocessor in the Flash EPROM 6.

Therefore, when main power is restored, the microprocessor can restart execution of the loading program stored in backed up RAM 5 in order to restart the cycle of erasing the Flash EPROM 6 and loading the operating system.

The invention reduces the risk of losing the operating system in the time necessary to erase the single-block Flash EPROM 6, or the sector containing the boot program in the case of multi-block Flash Eproms.

Obviously, the condition necessary for the invention to work correctly is that the boot program is always loaded in the Flash EPROM before the microprocessor Restart address is loaded.

Obviously, it would be possible to imagine variants and detailed improvements, or even to consider using equivalent means, without going outside the scope of the invention.

What is claimed as new and desired to be secured by Letters Patent of the United States is:

1. A system for updating an operating system of an information processing device, said system comprising:
    an information processing device, including,
        a power supply with an energy reserve,
        a microprocessor,
        an erasable non-volatile memory containing an existing operating system,
        a volatile memory having a memory back up function, and
        a power supply failure detecting device for detecting power supply failures in said power supply; and
    one of a console link and mass memory for updating said existing operating system,
    wherein, when updating said existing operating system with an updated operating system provided via said one of said console link and said mass memory, said existing operating system stores a boot program into said volatile memory,
    said existing operating system runs said boot program stored in said volatile memory,
    said boot program stored in said volatile memory erases said non-volatile memory and then stores said updated operating system therein from said one of said console link and said mass memory, and
    when said power supply failure detecting device detects a power supply failure in said power supply, said power supply running on said energy reserve enables said boot program stored in said volatile memory to store a restart address in said non-volatile memory,
    said restart address corresponds to an entry point in said boot program stored in said volatile memory at a time of said power supply failure,
    whereby when power is restored to said power supply, said microprocessor starts said boot program stored in said volatile memory at said restart address, and
    said boot program stored in said volatile memory continues to erase said non-volatile memory and then store said updated operating system therein from said one of said console link and said mass memory.

2. The system of claim 1, wherein said volatile memory comprises a random-access memory (RAM), and
    said volatile memory comprises a flash erasable programmable read-only memory (flash EPROM).

3. A process for updating an operating system of an information processing device, said process comprising:
    providing an information processing device, including,
        a power supply with an energy reserve,
        a microprocessor,
        an erasable non-volatile memory containing an existing operating system,
        a volatile memory having a memory back up function, and
        a power supply failure detecting device for detecting power supply failures in said power supply;
    updating said existing operating system via one of a console link and mass memory;
    storing a boot program into said volatile memory via said existing operating system, when updating said existing operating system with an updated operating system provided via said one of said console link and said mass memory;
    running said boot program stored in said volatile memory via said existing operating system;
    erasing said non-volatile memory via said boot program stored in said volatile memory;
    storing said updated operating system in said non-volatile memory from said one of said console link and said mass memory via said boot program stored in said volatile memory;
    storing a restart address in said non-volatile memory via said boot program stored in said volatile memory, when said power supply failure detecting device detects a power supply failure in said power supply and said power supply is running on said energy reserve;
    providing said restart address to correspond to an entry point in said boot program stored in said volatile memory at a time of said power supply failure;
    starting said boot program stored in said volatile memory at said restart address via said microprocessor, when power is restored to said power supply;
    continuing to erase said non-volatile memory via said boot program stored in said volatile memory; and
    continuing to store said updated operating system in said non-volatile memory from said one of said console link and said mass memory via said boot program stored in said volatile memory.

4. The process of claim 3, further comprising:
    providing said volatile memory as a random-access memory (RAM); and
    providing said volatile memory as flash erasable programmable read-only memory (flash EPROM).

* * * * *